United States Patent
Leonida et al.

(10) Patent No.: US 8,114,555 B2
(45) Date of Patent: Feb. 14, 2012

(54) HARDWARE SYSTEM FOR HIGH PRESSURE ELECTROCHEMICAL CELL

(75) Inventors: Andrei Leonida, West Hartford, CT (US); Robert J. Roy, West Springfield, MA (US); Kurt Matthew Critz, Enfield, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 0 days.

(21) Appl. No.: 13/097,161

(22) Filed: Apr. 29, 2011

(65) Prior Publication Data
US 2011/0204022 A1 Aug. 25, 2011

Related U.S. Application Data

(62) Division of application No. 10/814,019, filed on Mar. 31, 2004, now Pat. No. 7,955,751.

(51) Int. Cl.
*H01M 8/02* (2006.01)
*H01M 2/08* (2006.01)

(52) U.S. Cl. ........................................ 429/535; 429/510

(58) Field of Classification Search ........................ None
See application file for complete search history.

(56) References Cited

U.S. PATENT DOCUMENTS

| | | | |
|---|---|---|---|
| 4,798,946 A | 1/1989 | Fujii et al. | |
| 5,316,644 A | 5/1994 | Titterington et al. | |
| 5,324,565 A | 6/1994 | Leonida et al. | |
| 5,366,823 A | 11/1994 | Leonida et al. | |
| 5,466,354 A | 11/1995 | Leonida et al. | |
| 5,716,503 A | 2/1998 | Dean et al. | |
| 6,037,075 A | 3/2000 | Critz et al. | |
| 6,171,719 B1 | 1/2001 | Roy et al. | |
| 6,756,147 B1 * | 6/2004 | Bronold et al. | 429/465 |
| 6,989,214 B2 | 1/2006 | Mao et al. | |
| 2003/0179167 A1 | 9/2003 | Kolluri et al. | |
| 2004/0091702 A1 | 5/2004 | Hamilton et al. | |

FOREIGN PATENT DOCUMENTS

WO  WO 00/74161  *  7/2000
WO  2004086541 A2  10/2004

* cited by examiner

*Primary Examiner* — Jonathan Crepeau
(74) *Attorney, Agent, or Firm* — Carlson, Gaskey & Olds. P.C.

(57) ABSTRACT

A method of manufacture includes an electrochemical cell structure having a first conductive member and a second conductive member. The first conductive member is spaced from the second conductive member. An adhesive is disposed between the first conductive member and the second conductive member. The adhesive has a solid state and a liquid state. The adhesive is liquefied to form a seal between the first conductive member and the second conductive member.

19 Claims, 6 Drawing Sheets

HARDWARE SYSTEM FOR HIGH PRESSURE ELECTROCHEMICAL CELL

CROSS REFERENCE TO RELATED APPLICATIONS

This application is a divisional of U.S. patent application Ser. No. 10/814,019 dated Mar. 31, 2004 now U.S. Pat. No. 7,955,751.

BACKGROUND OF THE INVENTION

This invention relates to an electrochemical cell capable of operating at elevated pressures with respect to ambient pressure.

As a way of example, electrochemical cells may be used to electrolytically separate water into its components, hydrogen and oxygen or, alternatively, combine hydrogen with oxygen to form water and generate electricity. Each electrochemical cell typically has an anode cavity, a cathode cavity, and an electrolyte layer in contact with the electrodes. The electrolyte may be an ionically conductive material such as an ion-exchange membrane or liquid electrolyte solution contained in a porous matrix. The electrolyte is positioned between the anode cavity and the cathode cavity and serves to facilitate or enable the exchange of electrical charge and to separate the fluids between the two cavities.

The electrolyte area positioned between the anode and cathode cavities represents the working cell area or active area, where electrochemical processes take place. Several electrochemical cells of appropriate active area are assembled together to meet the capacity requirements for a specific application. There are numerous methods of connecting electrochemical cells together described by the way the fluids are admitted and removed to and from individual cells and the way electrical energy is provided for the cells' operation. A particular case refers to an assemblage of cells electrically connected in series and having the fluids managed in a parallel connection. Such an assembly is commonly known as a bipolar stack. The illustrations in this discussion will be made with respect to this particular mode of assembly without limiting the object of the disclosure.

Either the anode cavity or the cathode cavity or both may be formed from electrically conductive, essentially round metal plates, which are stacked upon one another as taught in Titterington et al. (U.S. Pat. No. 5,316,644) which is hereby incorporated by reference. Each plate may have a central area comprising a mesh screen that permits the passage of fluid through the plate. A peripheral area surrounds the mesh screen to form a seal that prevents the leakage of pressurized fluid out of the central area as well as between anode and cathode cavities. When all of the central areas of these plates are aligned, the stack of mesh screens forms a fluid cavity.

The fluid exchange between the fluid cavities and the outside is accomplished through openings located in the seal area of each of the metal plates. These openings are in fluid communication with either the anode or the cathode cavities. Several options are described for providing the fluid connections in Titterington, et al. (U.S. Pat. No. 5,316,644).

During the manufacturing process, the round metal plates are sealed together by a suitable adhesive applied to the peripheral area of each plate. The adhesive has a thickness that accumulates over the number of adjacent layers, creating a gap between the plates. The electrochemical cell and cell stack operation requires that the plates must be in intimate physical contact with one another to ensure adequate electrical conductivity between the plates. Accordingly, manufacturers typically deform the central areas of these plates together to place them in contact with one another.

Figure 1:
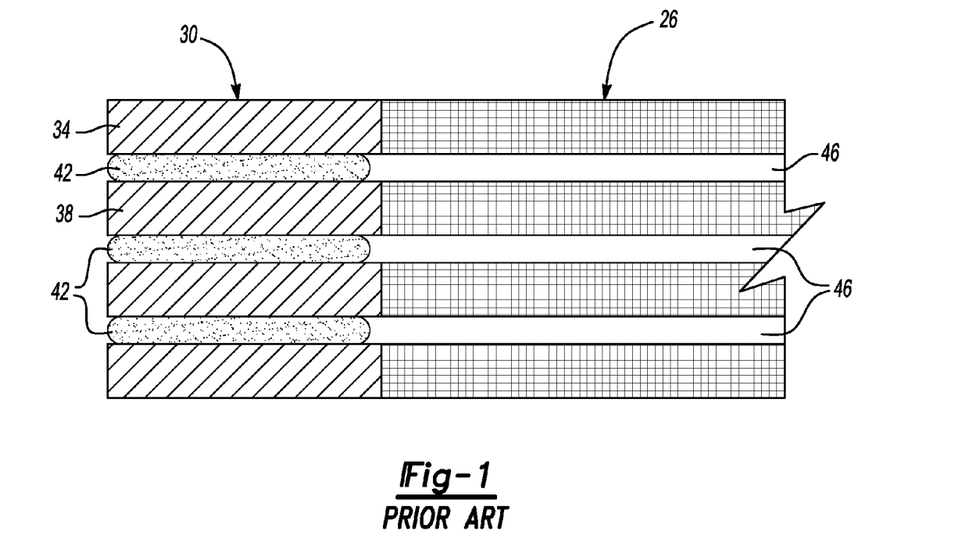
FIG. 1 illustrates bonding gaps created by prior art techniques.
Figure 2:
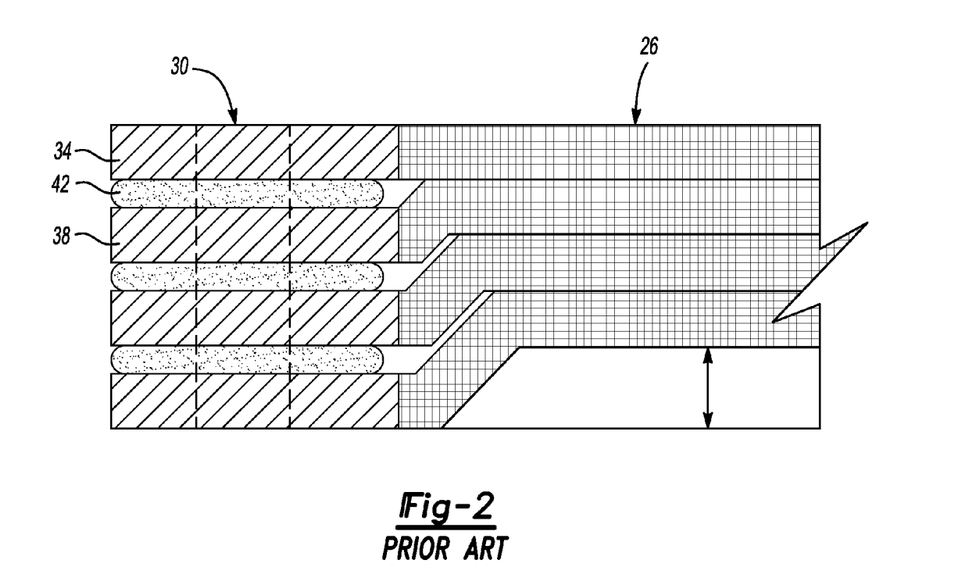
FIG. 2 illustrates the deformation of the plates of the prior art to place them in electrical contact with one another.

FIGS. 1 and 2 illustrate this manufacturing process in detail. As shown in FIG. 1, either the anode cavity or the cathode cavity or both, also known in the trade as a bipolar plate assembly, are formed by aligning first conductive member 34, an essentially round metal plate, over second conductive member 38, another round metal plate. Adhesive 42 is then applied by means of a spray between first conductive member 34 and second conductive member 38 to form a seal in peripheral area 30 to prevent the leakage of fluid out of central area 26 of stacked members 34 and 38. As a consequence of the thickness of the spray adhesive, bond gap 46 is formed between first conductive member 34 and second conductive member 38. As shown in FIG. 2, gap 46 is eliminated by deforming second conductive member 38 towards first conductive member 34 to place them in electrical contact with one another.

Each cavity may comprise ten or more bonded plates. Deforming the working area 26 can be accomplished before the individual cells are assembled into a stack or after the stack of cells is completed. The force required to deform these plates as an assembly may, however, damage the electrolyte. A pressure pad is required to bridge the gap created by the accumulated adhesive thickness and to press the plates together for adequate electrical contact. The pressure pad is an expensive component, which is needed to close the gaps between plates. The deforming operation using the pressure pad also adds labor expense to the assembly of the electrochemical cell.

Furthermore, a sprayed adhesive usually requires an organic solvent for its application. The spray adhesive may also require the addition of neat solvent to ensure uniformity of application for a thin layer of adhesive. These solvents create volatile organic compound (VOC) emissions that, for a large-scale production, raise environmental concerns.

A need therefore exists for an alternative bonding solution that eliminates the gap created by the spray adhesive between the plates, eliminates the need for a pressure pad, and reduces VOC emissions in the manufacturing of high pressure electrochemical cells.

SUMMARY OF THE INVENTION

The present invention comprises a structure for an electrochemical cell having an anode cavity, a cathode cavity, and an electrolyte sandwiched between the anode cavity and the cathode cavity and in contact with catalyst electrodes. The anode cavity or the cathode cavity, or both, are formed from stacked conductive members, such as metal plates, suitably formed to provide all the functionality needed for cell operation such as described in Titterington et al. (U.S. Pat. No. 5,316,644). Each conductive member of the present invention has at least one protrusion that nests within a corresponding oversized volume, or groove, of an adjacent conductive member. In the seal area of each conductive member, the adhesive is accommodated in the oversized volume. Accordingly, during the assembly process, excess adhesive that might normally create a gap between the conductive members flows into the oversized volume of the adjacent conductive member to thereby eliminate any bonding gap.

Preferably, the adhesive is an adhesive tape that has a liquid state and a solid state. The use of an adhesive tape permits greater control over the amount of adhesive used to prevent the creation of a bonding gap or a spillover as well as to encourage uniform application. Moreover, an adhesive tape reduces the emissions of VOCs that might raise environmental issues. While in solid state, the tape may be arranged between a protrusion of one conductive member and a volume of another conductive member in the peripheral area of each conductive member. When adequate heat is applied to the stack of conductive members, the adhesive tape melts and it flows into the volume. The adhesive tape may have a surface area sized the same or smaller than the peripheral area of the conductive members to prevent an overflow of adhesive and further prevent the creation of a bonding gap.

The invention further encompasses a method of manufacturing the unique electrochemical cell. Adhesive tape is arranged between one conductive member having protrusions and one conductive member having volumes. The adhesive tape is then liquefied under pressure and heat to form a seal between the conductive members. In this way, an anode or a cathode cavity or both may be formed. The cavities may then sandwich an electrolyte to complete the cell stack assembly.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 3:
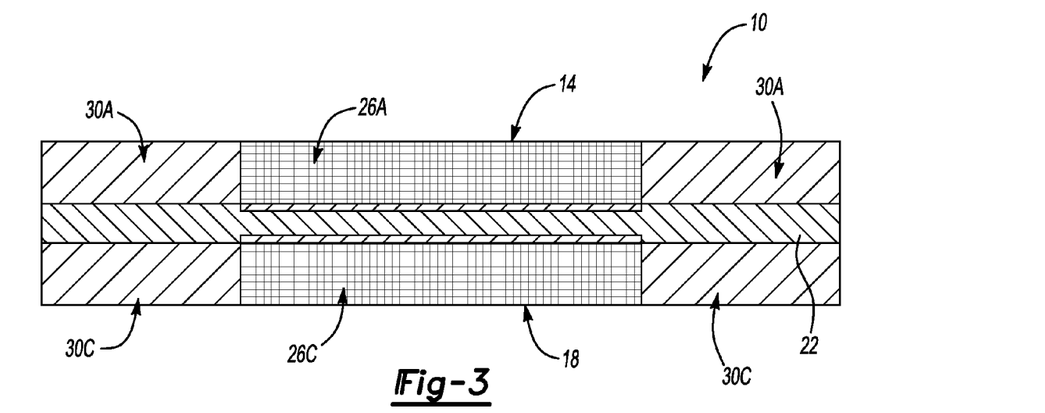
FIG. 3 illustrates a cross-sectional view of an electrochemical cell of the present invention, including anode cavity and cathode cavity.

FIG. 3 illustrates a side cross-sectional view of electrochemical cell 10. Electrochemical cell 10 has anode cavity 14 spaced from cathode cavity 18. Anode cavity 14 and cathode cavity 18 sandwich electrochemically conductive medium 22, such as a polymer electrolyte membrane or a liquid contained in a porous matrix. Moreover, as further known, electrochemical cell 10 has central area 26A of anode cavity 14, central area 26C of cathode cavity 18, which is also a fluid cavity. These fluid cavities are sealed by peripheral areas 30A and 30C to contain the fluid interactions between anode cavity 14 and the cathode cavity 18, respectively. As known, anode cavity 14 and cathode cavity 18 may comprise a stack of bonded cylindrical conductive members, such as metal plates, using the bonding material as the sealing agent.

Figure 4:
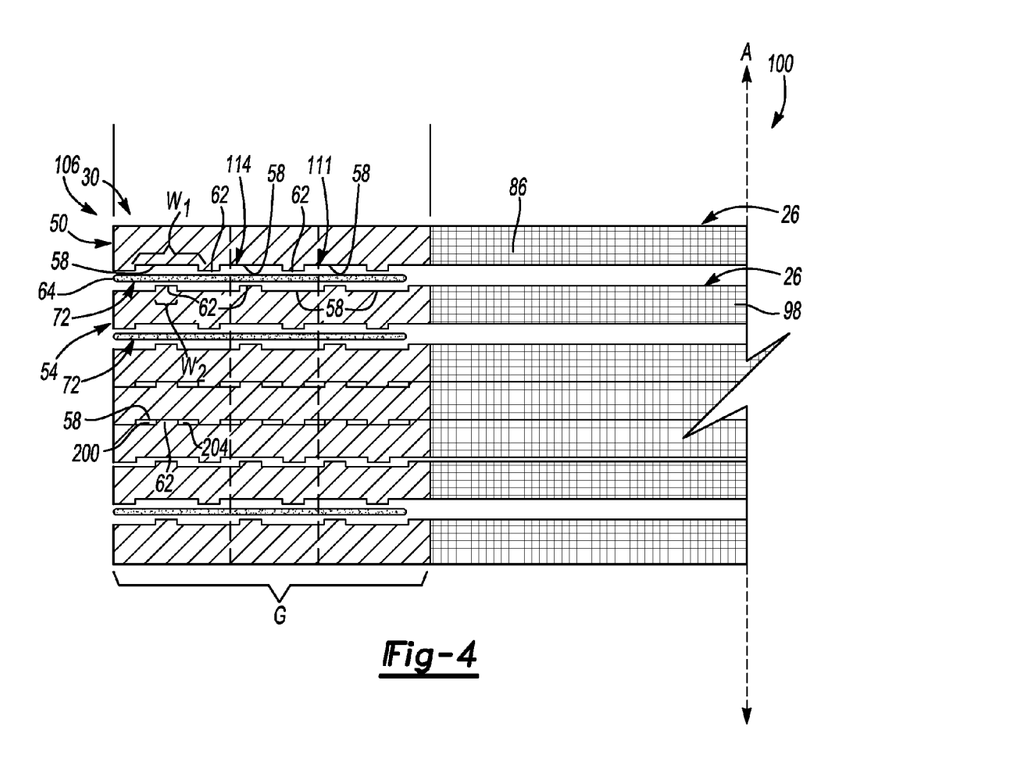
FIG. 4 illustrates a cross-sectional view of the cavity of an inventive electrochemical cell.

FIG. 4 illustrates in detail the inventive structure 100, a stack of conductive members forming either anode cavity 14 or cathode cavity 18 of electrochemical cell 10. First conductive member 50, here a round metal plate screen, has central area 26 and peripheral area 30. Central area 26 has first set of openings 86 to permit fluid to pass through first conductive member 50 and has peripheral area 30 to contain fluid within central area 26. Also, second conductive member 54, another round metal plate screen, has central area 26 and peripheral area 30. Second conductive member 54 also has second set of openings 98 in central area 26 to permit fluid to pass through second conductive member 54. First set of openings 86 is in fluid communication with second set of openings 98. When stacked together with other conductive members, first conductive member 50 and second conductive member 54 form cylinder 106 having axis A.

One aspect of the present invention eliminates bond gap 46 (shown in FIG. 1) by providing volumes 58 to receive excess adhesive. As shown in FIG. 4, first conductive member 50 is spaced from second conductive member 54. First conductive member 50 has volumes 58 and protrusions 62 in peripheral area 30. Likewise, second conductive member 54 has volumes 58 and protrusions 62 in peripheral area 30. Volumes 58 and protrusions 62 may extend radially about axis A. Volumes 58 have width $W_1$ greater than width $W_2$ of protrusions 62. In this way, volumes 58 are oversized and can easily accommodate protrusions 62 so that there is volume leftover to receive adhesive in liquid state.

As shown in FIG. 4, first conductive member 50 is aligned relative to second conductive member 54 so that protrusions 62 of first conductive member 50 are disposed over volumes 58 of second conductive member 54 while protrusions 62 of second conductive member 54 are aligned over volumes 58 of first conductive member 50. First conductive member 50 may be aligned relative to second conductive member 54 by placing holes at predetermined locations of each member and then stacking the members through these holes on rods as known. As shown in FIG. 4, volumes 58 may comprise volumes 111 and 114 that are spaced radially from each other relative to axis A.

Further, unlike the prior art, adhesive tape 64, rather than a spray adhesive, is used to bond and seal first conductive member 50 to second conductive member 54. The use of an adhesive tape promotes uniform application of the adhesive as well as reduces the emission of VOCs. Adhesive tape 64 may be die-cut to fit over peripheral area 30 of first conductive member 50 and second conductive member 54. Preferably, adhesive tape 64 has a surface area less than area G, the surface area of peripheral area 30, to reduce excess adhesive. Adhesive tape 64 preferably should also not be tacky at room temperature, should have very high bond strength, and should require only moderately high temperatures to form a bond. Applicant has tested a number of adhesive tapes and has found tapes using an ethylene acrylic acid copolymer, such as product number TBF 406 by 3M™ Company, to be particularly well suited for the present application.

When in solid state 72, adhesive tape 64, a polymer melt adhesive, is placed over peripheral area 30 between protrusions 62 and volumes 58 of first and second conductive member 50, 54. First conductive member 50 and second conductive member 54 thus sandwich adhesive tape 64 along peripheral area 30. Pressure is applied on first conductive member 50 and second conductive member 54, for example 1,083 kPa (157 psi), on peripheral area 30 before heating. The temperature of adhesive tape 64 is then gradually increased from ambient temperature to 160° C. to 163° C. following a predetermined schedule of about 3° C. per minute. The compressive load between first conductive member 50 and second conductive member 54 is then increased to about 10,345 kPa (1,500 psi) on peripheral area 30 when the temperature reaches 154° C.

During this process, adhesive tape 64 liquefies and excess adhesive flows into volumes 58 of first conductive member 50 and second conductive member 54. Then, protrusions 62 of second conductive member 54 extend into volumes 58 of first conductive member 50 while volumes 58 of second conductive member 54 receive protrusions 62 of first conductive member 50. To prevent the formation of a bonding gap, it is important that volumes 58 are large enough to accommodate protrusions 62 as well as anticipated excess adhesive tape 64. First conductive member 50 and second conductive member 54 are then allowed to reach room temperature under the higher pressure. The pressure is released when the assembly reaches ambient temperature. In this way, two or more conductive members may be formed together to form anode cavity 14 or cathode cavity 18 of a cylindrical shape.

While here, adhesive tape 64 is used as a securing member, other adhesive materials and techniques, such as adhesive pastes and solids, may be used too. Adhesive pastes, such as caulking compounds, uncured silicone rubber, polymer solutions in solvents and other similar materials may be used in some pre-formed state such as a paste rolled into a sheet die-cut to size, and applied to the peripheral area of the conducting members. For such a bonding material, compression would be required from the beginning until the bond is established. For adhesive solids, such as an adhesive film or brazing alloy, the approaches are similar. Clamping pressure is increased at the point when the solid material becomes fluid and pressure is maintained until the bond is formed.

By using this inventive technique, the offset due to the bond line is completely eliminated. There is also no need to exert additional force on the part during assembly. Further, the invention does not use organic solvents or create hazardous waste or fumes. Also, the inventive technique uses lower compression force during the bonding process and requires shorter time to bond than other techniques. In fact, this technique reduces assembly time significantly.

Figure 5:
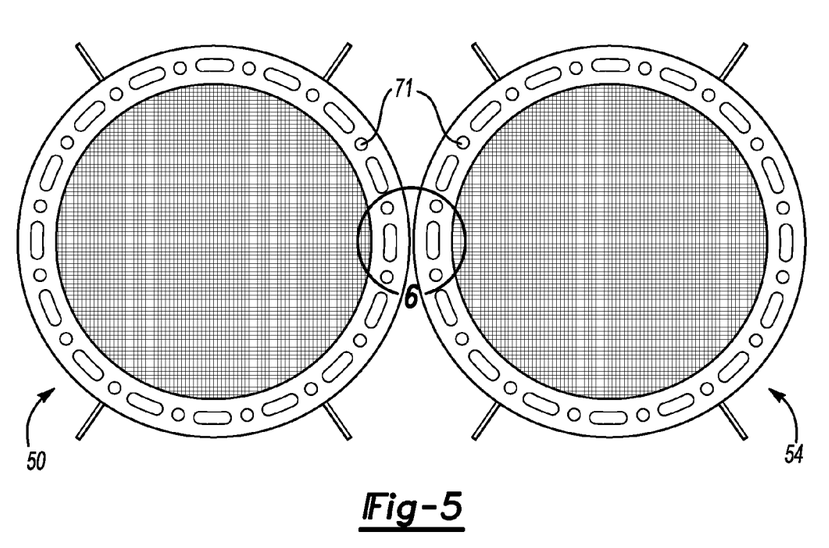
FIG. 5 illustrates an overhead view of two matching conductive members of the inventive electrochemical cell of FIG. 4.
Figure 6:
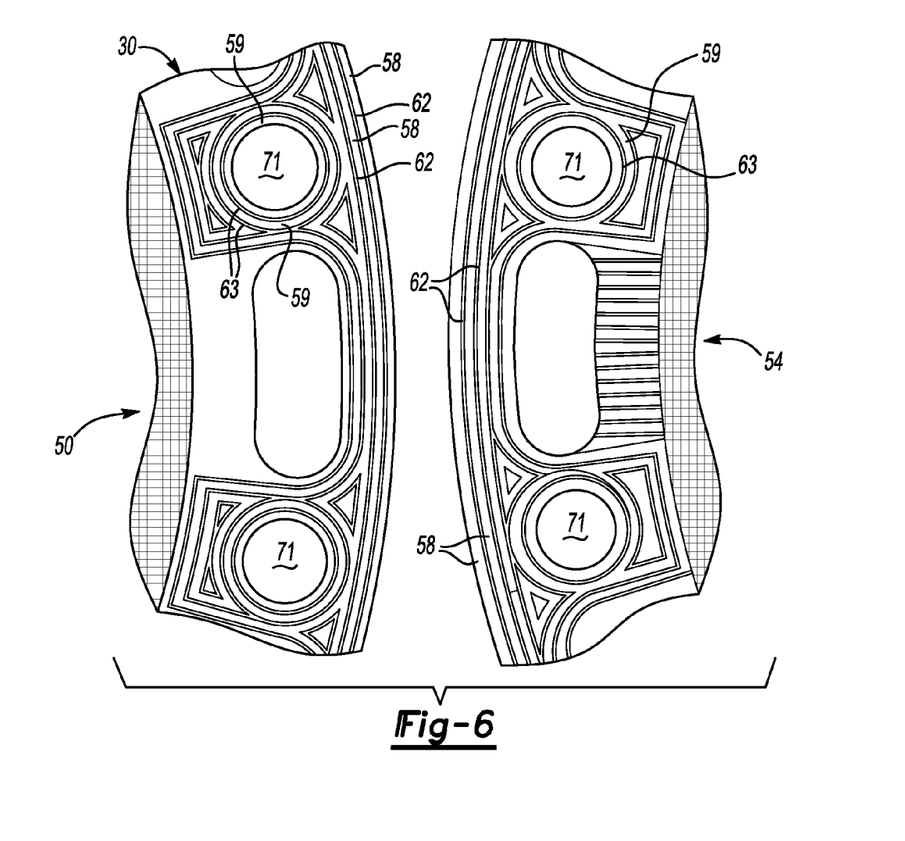
FIG. 6 shows a close up view of channels and ridges of each conductive member of FIG. 5.

FIG. 5 illustrates an overhead view of first conductive member 50 and second conductive member 54. As shown in FIGS. 5 and 6, openings 71 are provided in peripheral area 30 to communicate fluid to the active area as taught by Titterington, et al. In FIG. 6, a close-up view is provided of peripheral area 30 of each member. As shown, for each member 50 and 54, volumes 58 may extend entirely around peripheral area 30 forming channel volumes while protrusions 62 may likewise extend around peripheral area 30 forming ridges. Volumes 59 and ridges 63 may also be provided around openings 71.

Figure 7:
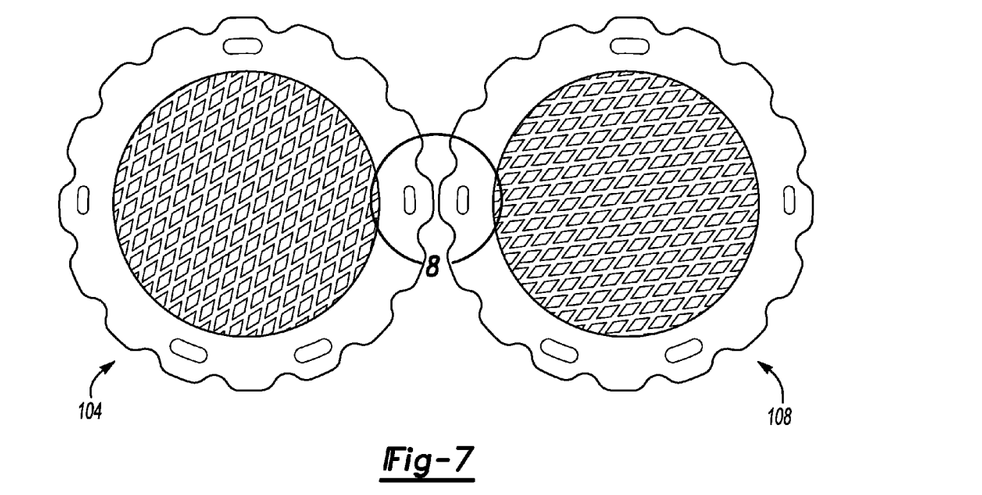
FIG. 7 illustrates an overhead view of two other matching conductive members of an electrochemical cell.
Figure 8:
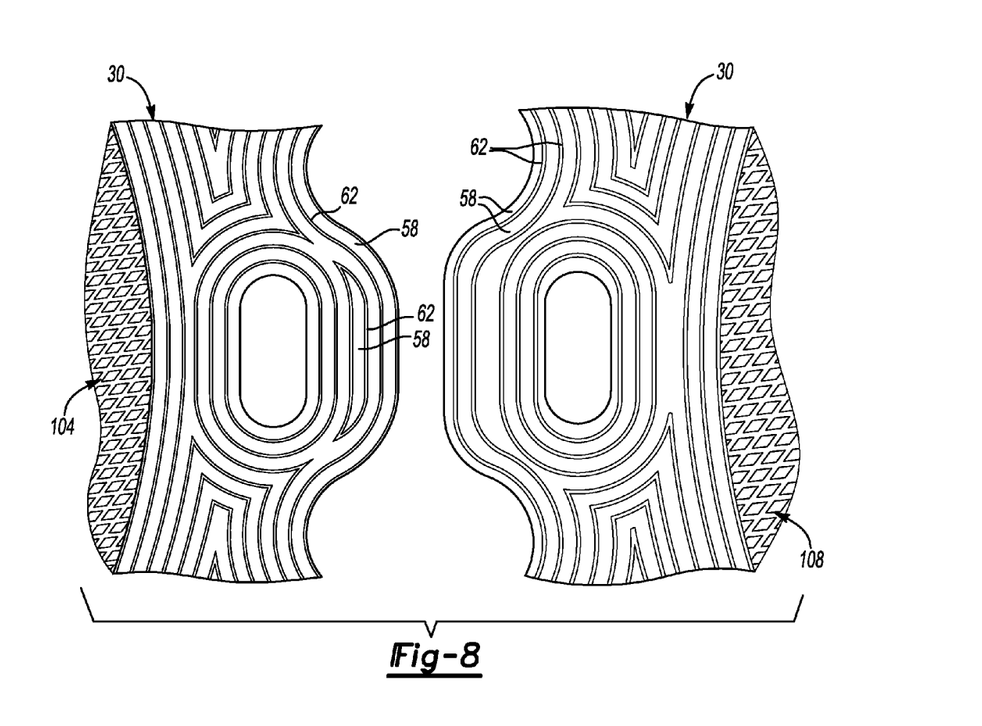
FIG. 8 shows a close up view of an alternative channel and ridge design of FIG. 7.

FIG. 7 illustrates an alternative pattern for first conductive member 104 and second conductive member 108. As shown in FIG. 8, like the patterns shown in FIG. 5, first conductive member 104 has volumes 58 and protrusions 62 that extend around peripheral area 30. Likewise, second conductive member 108 also has volumes 58 and protrusions 62 that extends around peripheral area 30. The patterns of FIGS. 6 and 8 may be etched by known techniques.

Figure 9:
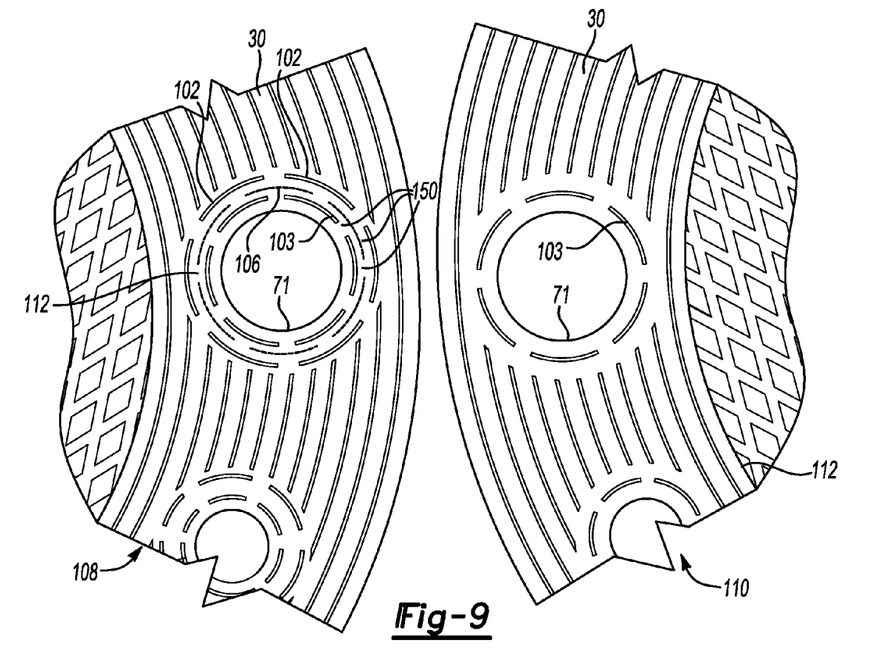
FIG. 9 shows a close up view of an alternative channel and ridge design.
Figure 10:
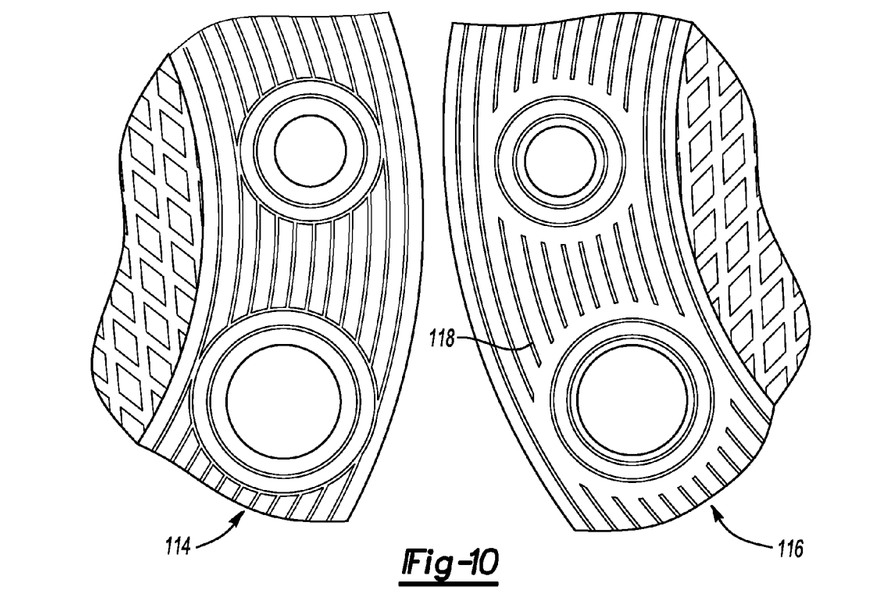
FIG. 10 shows a close up view of an alternative channel and ridge design.
Figure 11:
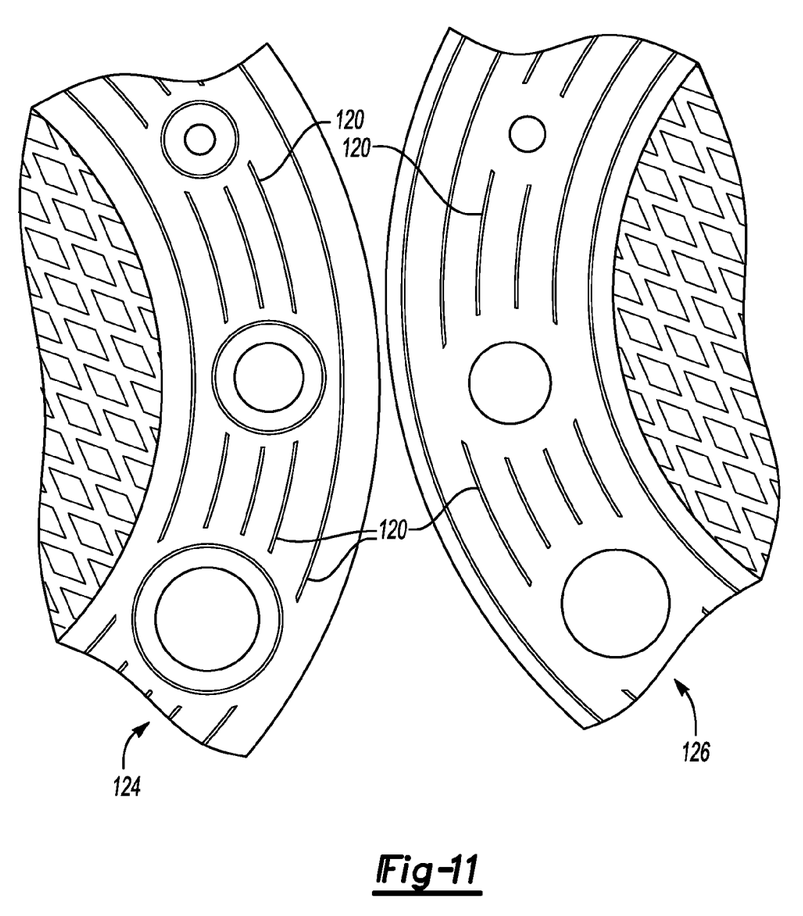
FIG. 11 shows a close up view of an alternative channel and ridge design.

FIGS. 9-11 show ridges 102 and 103 in a broken or interrupted pattern. It should be noted that ridges 102, 103 and 106 are formed around holes 71. Ridges 102 and 106 of first conductive member 108 are formed concentric around hole 71 and are formed in an interrupted pattern. Ridges 103 are also concentric around hole 71 of second conductive members 110. When first conductive member 108 is overlayed on second conductive member 110, ridges 103 (see dashed lines) are received in volume 112 of first conductive member 108. Again, volume 112 is oversized relative to ridges 103 to receive excess adhesive during the cell assembly process. Also, it should be noted that ridges 102 and 106 are staggered angularly relative to ridges 104 so that a tortuous path is formed between peripheral area 30 and hole 71.

Interrupted ridges 102, 103 and 106 allow venting of trapped gas formed in the bonding process to vent from peripheral area 30 to atmosphere. Trapped gas bubbles may otherwise form between members 108 and 100, especially when these members are thin and bonding thick. However, to ensure an adequate seal of peripheral area 30 during normal cell operation, continuous and uninterrupted sealing ridges 108 and 112 are provided. Gas is allowed to escape to the atmosphere before sealing ridges 108 and 112 seal peripheral area 30.

FIG. 10 illustrates first conductive member 114 and second conductive member 116. Interrupted ridges 118 are provided on second conductive member 116.

Finally, FIG. 11 shows broken ridges 120 on both first conductive member 124 and second conductive member 126. Ridges 120 have wider spacing between each other. The spacing of ridges and the pattern will be dictated by the needs of the particular application.

The aforementioned description is exemplary rather than limiting. Many modifications and variations of the present invention are possible in light of the above teachings. The preferred embodiments of this invention have been disclosed. However, one of ordinary skill in the art would recognize that certain modifications would come within the scope of this invention. Hence, within the scope of the appended claims, the invention may be practiced otherwise than as specifically described. For this reason the following claims should be studied to determine the true scope and content of this invention.

What is claimed is:

1. A method of manufacturing an electrochemical cell structure comprising the steps of:
   a) spacing a first conductive member relative to a second conductive member;
   b) arranging an adhesive between the first conductive member and the second conductive member, the adhesive having a solid state and a liquid state; and
   c) liquefying the adhesive to secure the first conductive member to the second conductive member
   d) defining a first plurality of volumes to receive the adhesive in the liquid state on the first conductive member between a first plurality of ridges; and
   e) defining a second plurality of ridges on the second conductive member and placing the second plurality of ridges within corresponding ones of the first plurality of volumes defined by the first plurality of ridges, wherein each of the first plurality of volumes defined by the first plurality of ridges is sufficiently larger than the corresponding one of the second plurality of ridges to accommodate the adhesive in the liquid state and the corresponding one of the second plurality of ridges.

2. The method of claim 1 wherein providing the volume comprises etching the volume.

3. The method of claim 1 where the adhesive is a tape.

4. The method of claim 3 including the step of:
   f) sizing the tape to accommodate the first conductive member.

5. The method of claim 4 wherein the first conductive member has a central area and a peripheral area surrounding the central area and the tape is sized no larger than the peripheral area.

6. The method of claim 5 wherein the tape is sized smaller than the peripheral area.

7. The method of claim 4 wherein the tape is sized by die cutting the tape.

8. The method of claim 1 including the step of:
   g) applying pressure to squeeze the adhesive between the first conductive member and the second conductive member.

9. The method of claim 8 including the step of:
   h) heating the adhesive into the liquid state.

10. The method of claim 9 including the step of:
    i) increasing the pressure after the adhesive is in the liquid state.

11. A method of manufacturing an electrochemical cell structure comprising the steps of:
    a) spacing a first conductive member relative to a second conductive member;
    b) arranging an adhesive between the first conductive member and the second conductive member, the adhesive having a solid state and a liquid state;
    c) liquefying the adhesive to secure the first conductive member to the second conductive member;
    d) providing a volume to receive the adhesive in the liquid state on the first conductive member; and
    e) providing a protrusion on the second conductive member and placing the protrusion in the volume, wherein the protrusion is sized sufficiently smaller than the volume so as to accommodate the adhesive in the liquid state in a space formed in the volume and defined in part by the protrusion.

12. The method of claim 11 where the adhesive is a tape.

13. The method of claim 12 wherein the first conductive member has a central area and a peripheral area surrounding the central area and the tape is sized no larger than the peripheral area.

14. The method of claim 11 including the step of:
    f) applying pressure to squeeze the adhesive between the first conductive member and the second conductive member.

15. The method of claim 14 including the step of:
    g) heating the adhesive into the liquid state.

16. The method of claim 15 including the step of:
    h) increasing the pressure after the adhesive is in the liquid state.

17. A method of manufacturing an electrochemical cell structure comprising the steps of:
    a) providing a first conductive member having a first central area surrounded by a first peripheral area and providing a second conductive member having a second central area surrounded by a second peripheral area;
    b) aligning the first conductive member relative to the second conductive member so that the first central area overlaps the second central area and the first peripheral area over laps the second peripheral area;
    c) disposing an adhesive tape between the first peripheral area and the second peripheral area, the adhesive tape having a solid state and a liquid state;
    d) liquefying the adhesive tape to secure the first conductive member to the second conductive member;
    e) providing a volume on the first peripheral area to receive the adhesive in the liquid state on the first conductive member;
    f) providing a protrusion on the second peripheral area of the second conductive member; and
    g) disposing the protrusion in the volume, wherein the protrusion is sized sufficiently smaller than the volume so as to accommodate the adhesive in the liquid state in a space formed in the volume and defined in part by the protrusion.

18. The method as recited in claim 1, wherein the first plurality of ridges defining the first plurality of volumes comprises an interrupted pattern.

19. The method as recited in claim 1, wherein the second plurality of ridges define a second plurality of volumes for receiving the first plurality of ridges.

* * * * *